United States Patent
Subramaniyan et al.

(10) Patent No.: US 10,262,127 B2
(45) Date of Patent: Apr. 16, 2019

(54) SYSTEMS AND METHOD FOR SECURELY SHARING AND EXECUTING DATA AND MODELS

(71) Applicant: General Electric Company, Schenectady, NY (US)

(72) Inventors: Arun Karthi Subramaniyan, Clifton Park, NY (US); Alexandre Nikolov Iankoulski, Watervliet, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 143 days.

(21) Appl. No.: 15/479,906

(22) Filed: Apr. 5, 2017

(65) Prior Publication Data
US 2018/0293366 A1    Oct. 11, 2018

(51) Int. Cl.
*G06F 21/00* (2013.01)
*G06F 21/44* (2013.01)
*G06F 21/10* (2013.01)
*G06F 21/64* (2013.01)

(52) U.S. Cl.
CPC .............. *G06F 21/44* (2013.01); *G06F 21/10* (2013.01); *G06F 21/64* (2013.01)

(58) Field of Classification Search
CPC ........ G06F 21/123; G06F 21/14; G06F 21/44; G06F 2221/0797
USPC ........................................................ 726/26
See application file for complete search history.

(56) References Cited

U.S. PATENT DOCUMENTS

| | | | |
|---|---|---|---|
| 5,724,425 A | 3/1998 | Chang et al. | |
| 7,131,144 B2 | 10/2006 | Rabin et al. | |
| 7,374,736 B2* | 5/2008 | Payne | B01D 53/56 423/235 |
| 7,693,877 B1 | 4/2010 | Zasman | |
| 7,788,502 B1 | 8/2010 | Donlin et al. | |
| 8,370,046 B2* | 2/2013 | Jiang | F02C 9/00 60/39.091 |
| 9,068,275 B2* | 6/2015 | Liu | C30B 11/00 |
| 9,069,599 B2* | 6/2015 | Martinez | G06F 9/455 |
| 9,587,627 B2* | 3/2017 | Fu | F03D 7/0224 |
| 2002/0071393 A1* | 6/2002 | Musoll | G06F 9/546 370/248 |

(Continued)

OTHER PUBLICATIONS

Keating, Brian A., et al. "An overview of APSIM, a model designed for farming systems simulation." European journal of agronomy 18.3-4 (2003): 267-288. (Year: 2003).*

(Continued)

*Primary Examiner* — Syed A Zaidi
(74) *Attorney, Agent, or Firm* — GE Global Patent Operation; Nitin Joshi (57) ABSTRACT

A simulation computer device for securely executing a model includes at least one processor in communication with at least one memory device. The simulation computer device is configured to store a smart container including a model and a usage policy. The simulation computer device is also configured to receive a plurality of inputs for the model and determine whether to validate the model based on the usage policy. The simulation computer device is further configured to execute the model with the plurality of inputs if the model was validated. Moreover, the simulation computer device is configured to transmit at least one output.

20 Claims, 6 Drawing Sheets

(56) References Cited

U.S. PATENT DOCUMENTS

| | | | |
|---|---|---|---|
| 2004/0158788 A1* | 8/2004 | Kaszynski | G06F 17/5022 714/741 |
| 2005/0283824 A1* | 12/2005 | Nakamura | G06F 21/604 726/1 |
| 2006/0045264 A1 | 3/2006 | Kocher et al. | |
| 2006/0143715 A1* | 6/2006 | Chow | G06F 21/629 726/27 |
| 2007/0220279 A1 | 9/2007 | Northcutt et al. | |
| 2007/0244575 A1* | 10/2007 | Wojsznis | G05B 17/02 700/38 |
| 2008/0065466 A1* | 3/2008 | Liu | G06F 8/10 705/348 |
| 2008/0066189 A1* | 3/2008 | Liu | H04L 67/02 726/28 |
| 2010/0332404 A1 | 12/2010 | Valin | |
| 2011/0081008 A1* | 4/2011 | Lawson | H04M 15/41 379/114.03 |
| 2011/0283259 A1* | 11/2011 | Lawson | G06F 8/61 717/121 |
| 2015/0172321 A1* | 6/2015 | Kirti | H04L 63/20 726/1 |

OTHER PUBLICATIONS

Calheiros, Rodrigo N., et al. "Cloudsinn: A novel framework for modeling and simulation of cloud computing infrastructures and services." arXiv preprint arXiv:0903.2525 (2009). (Year: 2009).*

Rosenblum, Mendel, et al. "Using the SimOS machine simulator to study complex computer systems." ACM Transactions on Modeling and Computer Simulation (TOMACS) 7.1 (1997): 78-103. (Year: 1997).*

Murphy, William J., "Proposal for a Centralized and Integrated Registry for Security Interests in Intellectual Property," 41 IDEA 297 (2001-2002), 316 pp.

Collberg, Christian S., "Watermarking, Tamper-Proofing, and Obfuscation—Tools for Software Protection," IEEE Transactions on Software Engineering, vol. 28, Issue 8, pp. 735-746, Aug. 2002.

Sengupta, Intellectual Property Cores: Protection Designs for CE Products, IEEE Consumer Electronics Magazine, vol. 5, Issue 1, pp. 83-88, Jan. 2016.

* cited by examiner

SYSTEMS AND METHOD FOR SECURELY SHARING AND EXECUTING DATA AND MODELS

BACKGROUND

The field of the disclosure relates generally to securely share data and execute models and, more particularly, to systems and method for validating the execution of a model based on a usage policy.

When marketing or selling machines, software packages, or processes, it may become necessary to share models of those items with others outside of the owner's control. For example, when offering to sell a turbine, it may be necessary to allow the prospective purchaser to analyze a model of the turbine to determine how the turbine might work with the prospective purchaser's pre-existing equipment and designs. In another example, when collaborating on a joint project, it may be necessary for each collaborator to provide a model of how their component of the collaboration will respond based on received inputs. However, a potential problem with providing models is that the models may be shared beyond those that are authorized to have access to them. In addition, unscrupulous individuals may attempt to reverse engineer the process or apparatus associated with the model.

Furthermore, in the case of pre-compiled software packages, there is a significant risk of software piracy spreading the software package to those who have not paid for the right to use the package. In addition, it is possible to reverse engineer a software package based on repeated simulations by changing the inputs and monitoring the outputs of the software package. Accordingly, properly securing a model or software package from unauthorized use may be difficult.

BRIEF DESCRIPTION

In one aspect, a simulation computer device for securely executing a model is provided. The simulation computer device includes at least one processor in communication with at least one memory device. The simulation computer device is configured to store a smart container and a usage policy. The simulation computer device is also configured to receive a plurality of inputs for the model and determine whether to validate the model based on the usage policy. The simulation computer device is further configured to execute the model with the plurality of inputs if the model was validated. Moreover, the simulation computer device is configured to transmit the one of more outputs.

In another aspect, a method for securely executing a model is provided. The method is implemented using a simulation computer device. The simulation computer device includes a processor in communication with a memory. The method includes storing, in the memory, a smart container including a model and a usage policy. The method also includes receiving, by the processor, a plurality of inputs for the model and determining whether to validate the model based on the usage policy. The method further includes executing the model with the plurality of inputs if the model was validated. Moreover, the method includes transmitting at least one output.

In yet a further aspect, a system for securely executing a model is provided. The system includes at least one smart contract node and a simulation computer device in communication with the at least one smart contract node. The simulation computer device includes a processor in communication with a memory. The simulation computer device is programmed to store a smart container including a model, a usage policy, and an internal key. The simulation computer device is also programmed to receive a plurality of inputs for the model. The simulation computer device is further programmed to transmit the internal key to the at least one smart contract node and receive an external key from the at least one smart contract node. Moreover, the simulation computer device is programmed to determine whether to validate the model based on the external key and the usage policy. Moreover, the simulation computer device is programmed to execute the model with the plurality of inputs if the model was validated. In addition, simulation computer device is programmed to transmit at least on output. The smart contract node is configured to store the external key and update the external key on a periodic basis. The smart contract node is also configured to receive the internal key from the simulation computer device and transmit the external key to the simulation computer device based on the received internal key.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer", and related terms, e.g., "processing device", "computing device", and controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The simulation system described herein provides a method for securing the intellectual property included in a model while allowing the model to be executed. Specifically, the embodiments described herein include a computing device that is configured to execute a smart container that validates a model prior to executing the model. The computing device may use a plurality of methods of validating the model, including accessing outside nodes to confirm that the user is authorized to execute the model. Once validated, the computing device executes the model and provides the outputs to the user. In some embodiments, the computer device disables an invalidated model so that the model provides invalid and/or incorrect outputs. The systems and method described herein allow for protecting the intellectual property while allowing users to access and execute the model without direct supervision.

Figure 1:
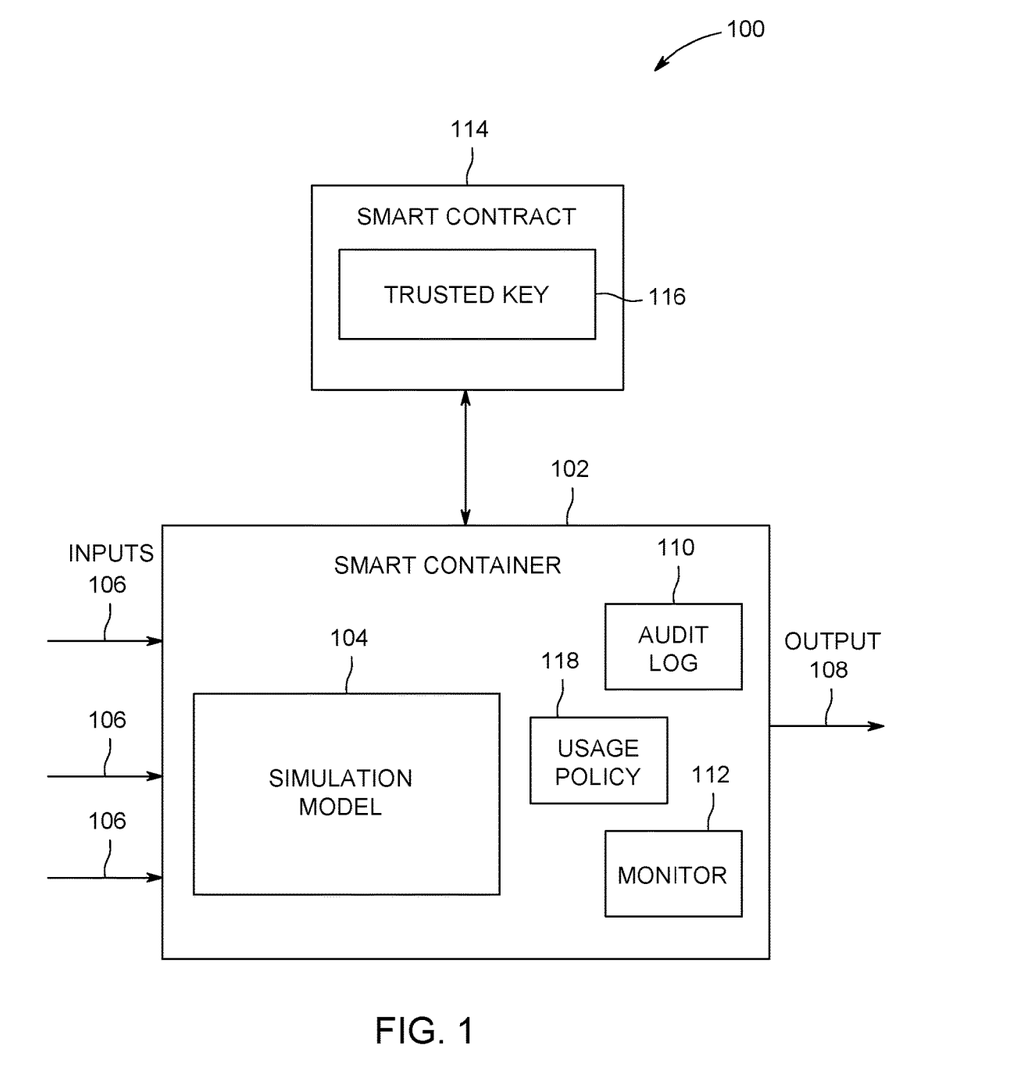
FIG. 1 is a schematic view of a security system including a smart container for securely executing a model.

FIG. 1 is a schematic view of a security system 100 including a smart container 102 for securely executing a model 104. Alternatively, any apparatus, process, and/or software package that may be shared that contains intellectual property that would benefit from protection as described herein may be used.

In the exemplary embodiment, smart container 102 (also known as a security container) is a software shell that protects and encapsulates model 104. In this embodiment, smart container 102 provides an interface to access model 104. Smart container 102 includes a set of data structures and subroutines that implement the interface between model 104 and outside sources. Smart container 102 accepts inputs 106 for model 104 and transmits outputs 108 from model 104. In some embodiments, smart container 102 is configured as a triplestore (also known as a resource description framework (RDF) store) database. In these embodiments, smart container 102 stores model 104 in a triplestore database and retrieves the data from model 104 through either queries or through RDF import/exports. In some further embodiments, smart container 102 stores model 104 in a relational database engine (such as SQL or NoSQL) and uses a triplestore database engine to communicate with model 104. In still further embodiments, smart container 102 stores model 104 in a graph database (also known as a quadstore database).

In the exemplary embodiment, smart container 102 also includes an audit log 110, a monitor 112, and a usage policy 118. In some embodiments, smart container 102 is in communication with a smart contract 114. In some of these embodiments, smart contract includes a trusted key 116.

In the exemplary embodiment, model 104 is a model of an apparatus, a process, or a device. In some embodiments, model 104 is a simulation model for simulating physical systems. In other embodiments, model 104 is a forecasting model for modeling an economic forecast based on the received inputs and/or settings. In still other embodiments, model 104 includes a database of test results, where the user is able to receive the test results based on their selected inputs. In still further embodiments, model 104 is a software package, such as a library, that responds based on specific input requests.

Model 104 is configured to receive a plurality of inputs and provide at least one output based on the apparatus or device that is being simulated. For example, model 104 may be a model of a braking device for an automobile. As inputs, in this example, model 104 receives the speed of the vehicle, the weight of the vehicle, attributes of the wheels, amount of pressure applied to the brake pedal, amount of time pressure is applied to the brake pedal, and other details or attributes of the vehicle. Based on these inputs, model 104 provides the amount of force applied by the braking device. In this example, the manufacturer of the braking device generates a model that simulates how the device operates that may be disseminated to others that are manufacturing and/or assembling vehicles to determine if the braking device fits their needs.

In another example, model 104 simulates a complicated device or process. For example, the device may be a turbine engine. The process may be a complicated economic model. For both devices and processes, a significant amount of time, energy, and intellectual property may be contained in the associated model 104. In still a further example, model 104 is a compiled software package, such as, but not limited to, a graphical drawing package or compiled library.

In the exemplary embodiment, audit log 110 stores information about received inputs 106 and executions of model 104. In some embodiments, audit log 110 stores the actual received inputs 106. In other embodiments, audit log 110 stores whether received inputs 106 are within accepted ranges. In some embodiments, audit log 110 stores the date and time of each execution of model 104, information about the computer that model 104 is executing on, information about the connected computer networks, and other information about the execution of model 104.

In the exemplary embodiment, monitor 112 is configured to monitor smart container 102 and model 104. In some embodiments, monitor 112 is configured to detect unauthorized access to smart container 102, such as an attempt to bypass smart container 102 to access model 104. In some embodiments, monitor 112 is further configured to compare audit log 110 to usage policy 118 to determine if smart container 102 is authorized to execute model 104.

In the exemplary embodiment, model 104 includes limitations on execution, which are contained in usage policy 118. Some of the limitations include, but are not limited to, a predetermined number of executions, a predetermined number of executions within a predetermined period of time, only one copy may be active, predetermined limited input ranges, an expiration date, and limitations on the computer or computer network hosting model 104. In some embodiments, usage policy is stored by smart container 102. In other embodiments, usage policy 118 is also stored by smart contract 114. In the exemplary embodiment, smart container 102 compares the information audit log 110 and monitor 112 to usage policy 118 to determine whether or not model 104 is authorized to execute.

In the exemplary embodiment, monitor 112 reviews usage of smart container 102 and model 104 in two methods. In the first method, monitor 112 reviews each access attempt and/or query against model 104 and compares the access attempt in view of usage policy 118. For example, monitor 112 reviews a received query with inputs 106 that are outside of the predetermined limited input ranges. Monitor 112 raises an alert and smart container 102 prevents the query from being executed by model 104.

In the second method, monitor 112 builds one or more patterns of expected usage based on the usage policy 118 and the audit log 110. Everytime that the user is authorized to access model 104, monitor 112 analyzes that access in view of the other successful accesses of model 104. In this way, monitor 112 is able to determine how user normally accesses model 104. If monitor 112 reviews an access attempt that significantly deviates from these patterns, monitor 112 raises an alert to smart container 102. For example, if the user normally uses model 104 between 8 AM and 5 PM, and monitor 112 notices an attempt to access model 104 at 2 AM, then monitor 112 may raise an alarm and request that smart container 102 deny the request. Another example may be where user normally enters requests once a second and then monitor 112 notices 100 requests in a second, monitor 112 may raise an alarm.

In the exemplary embodiment, smart container 102 receives a plurality of inputs 106 as a part of a request to execute model 104. In this embodiment, smart container 102 is connected to the Internet or another network in order to access smart contract 114. Smart container 102 transmits a request to smart contract 114 to request permission to execute model 104 using the provided inputs 106. The request includes information necessary for smart contract 114 to determine the validity of smart container 102. For example, the request may include, but is not limited to, a model identifier, information about the inputs 106, information from audit log 110, information from monitor 112, and information about the computer device or computer network that smart container 102 is executing on. In some embodiments, the request includes an internal key, such as a public key.

In response to the request, smart contract 114 determines whether or not to approve the execution of model 104. Smart contract 114 analyzes the request information to determine if model 104 is authorized to execute. If the determination is yes, then smart contract 114 transmits approval to smart container 102. In some embodiments, the approval includes a trusted key 116 that allows model 104 to execute (i.e., one time). In these embodiments, trusted key 116 may be a private key in response to the received public key. In some embodiments, trusted key 116 is updated on a periodic basis to increase security and prevent unauthorized access.

In other embodiments, where smart container 102 is not able to access outside networks, smart container 102 determines whether or not to execute model 104 based on information, such as, but not limited to, inputs 106, audit log 110, monitor 112, and usage policy 118. For example, smart container 102 receives a request to execute model 104 including a plurality of inputs 106. First, smart container 102 analyzes monitor 112 to determine if smart container 102 has been breached. If not, smart container 102 then compares the inputs to usage policy 118 to determine whether or not inputs 106 are allowed. If so, smart container 102 then analyzes audit log 110 in view of usage policy 118 to determine if model 104 is authorized to be executed. The authorization analysis may include, but is not limited to, has enough time elapsed since the last execution, are there any allowed executions left, has model 104 expired, and is this computer authorized to execute model 104. Smart container 102 then executes model 104 if authorized. Smart container 102 receives one or more outputs 108 from model 104 and transmits those outputs 108.

In some embodiments, the security of smart contract 114 is protected by using blockchains. A blockchain is a distributed database that maintains a continuously-growing list of ordered records, known as blocks. Each block may contain at least a timestamp and a link to the previous block in the chain. The link to the previous block may be a hash of the previous block. In the exemplary embodiment, the first block of smart contract 114 contains information about smart container 102, such as usage policy 118 and a first trusted key 116. The second block contains information from audit log 110 and a second trusted key 116 that replaces the first and a hashed copy of the first block. The third block contains a new version of trusted key 116 and a hashed copy of the second block. This continues on with each block adding on to the next while containing a hash of the previous blocks in the blockchain.

To ensure the security of the information contained in the blockchain, copies of the blockchain may be distributed across multiple computer devices, known as nodes. These nodes maintain the blockchain, update the blockchain when changes occur, and ensure the stability of the blockchain itself. In some embodiments, nodes may be also used to calculate the hash of the previous blocks. As the blockchain grows, the processing power needed to calculate the hash of the previous blocks grows as well. In these embodiments, the processing of the hash may be distributed over multiple computer devices to improve the speed of processing and/or to reduce burdens on the hashing processor. When a node processes (hashes) a block, that node may be referred to as a miner, where the action of validating and hashing the block is referred to as mining.

Because each of the smart contract blockchains share information, attempts by multiple copies of the same smart container 102 to access different copies of smart contract 114 are detected. As smart contract 114 stores data about executions of model 104, this ensures the integrity of both smart contract 114 and smart contract's ability to authorize smart container 102. In other embodiments, smart contract 114 may be stored and secured in other methods. The above use of blockchain is for example only, and one skilled in the art will be able to determine multiple methods for storing smart contract 114 and allowing for the exchange of public and private keys in a manner that is remote from smart container 102 and the network hosting smart container 102.

In some embodiments, model 104 receives continuous inputs 106, where the inputs 106 are constantly changing over time. In these embodiments, model 104 constant generates updated outputs 108 based on inputs. In other embodiments, model 104 may be a generator, such as a noise generator. In these embodiments, model 104 receives a few settings as inputs 106 at a starting point in time and continually produces data using those initial inputs 106. In some further embodiments, model 104 generates a log file as output 108. In some of these embodiments, model 104 generates graphics or other information as output 108.

Figure 2:
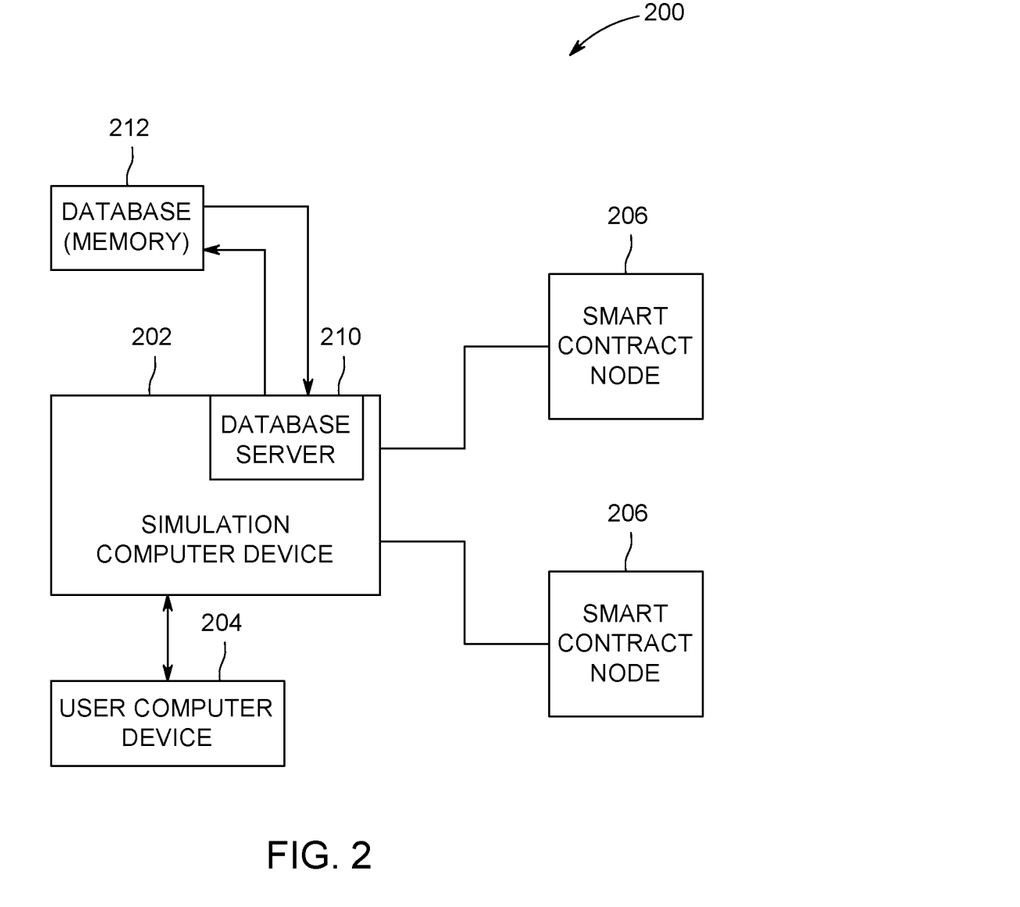
FIG. 2 is a schematic view of an exemplary simulation system to securely execute a model using the security system shown in FIG. 1.

FIG. 2 is a schematic view of an exemplary simulation system 200 to securely execute model 104 using security system 100 (both shown in FIG. 1). In the exemplary embodiment, simulation system 200 is used for authorizing, executing, and securing a model, such as model 104. Simulation system 200 includes a simulation computer device 202 configured to authorize and securely execute model 104 through smart container 102 (shown in FIG. 1). As described below in more detail, simulation computer device 202 is configured to store smart container 102 including model 104 and usage policy 118 (shown in FIG. 1). Simulation computer device 202 is further configured to receive a plurality of inputs 106 for model 104, determine whether to validate model 104 based on usage policy 118, execute model 104 with plurality of inputs if model 104 was validated, and transmit at least one output 108.

In the exemplary embodiment, user computer devices 204 are computers or computer devices that include a web browser or a software application, which enables user computer devices 204 to access simulation computer device 202. More specifically, user computer devices 204 may be communicatively coupled to the simulation computer device 202 through various wired and wireless interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 204 can be any device capable of accessing simulation computer device 202 including, but not limited to, a desktop computer, a laptop computer, a personal digital assistant (PDA), a cellular phone, a smartphone, a tablet, or other web-based connectable equipment.

In the exemplary embodiment, smart contract nodes 206 are computers or computer devices that include a web browser or a software application, which enables smart contract nodes 206 to store and update smart contracts in blockchains, such as smart contract 114 (shown in FIG. 1) and to access simulation computer device 202 through the Internet. More specifically, smart contract nodes 206 may be communicatively coupled to the simulation computer device 202 through various wired and wireless interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Smart contract nodes 206 can be any device capable of accessing simulation computer device 202 including, but not limited to, a desktop computer, a laptop computer, a personal digital assistant (PDA), a cellular phone, a smartphone, a tablet, or other web-based connectable equipment. For security purposes, smart contract nodes 206 use blockchains as distributed legers to securely store and update trusted keys 116 (shown in FIG. 1). Smart contract nodes 206 are also configured to be outside of the control of the computer network and/or device that is executing model 104. In other embodiments, smart contract nodes 206 may also be other public/private key exchange systems that are remote from simulation computer device 202 and that allow the systems to work as described herein.

A database server 210 is coupled to database 212, which contains information on a variety of matters, as described herein in greater detail. In one embodiment, centralized database 212 is stored on simulation computer device 202. In an alternative embodiment, database 212 is stored remotely from simulation computer device 202 and may be non-centralized. In some embodiments, database 212 includes a single database having separated sections or partitions or in other embodiments, database 212 includes multiple databases, each being separate from each other. In the exemplary embodiment, database 212 stores audit log data and usage policy 118 for smart container 102. In some embodiments, a user is able to access database 212 by logging into simulation computer device 202, such as through user computer device 204.

Simulation computer device 202 is a computer device that includes a web browser or a software application, which enables simulation computer device 202 to store and execute smart container 102 and model 104. In the exemplary embodiment, simulation computer device 202 is communicatively coupled to one or more smart contract nodes 206 through the Internet. More specifically, simulation computer device 202 may be communicatively coupled to smart contract nodes 206 through various wired and wireless interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Simulation computer device 202 can be any device capable of executing model 104 including, but not limited to, a desktop computer, a laptop computer, a personal digital assistant (PDA), a cellular phone, a smartphone, a tablet, or other web-based connectable equipment.

Figure 3:
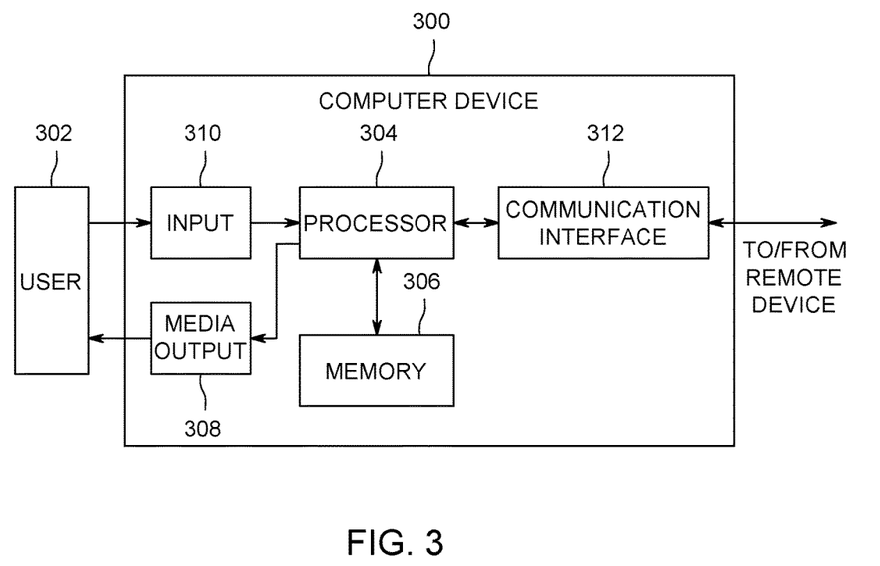
FIG. 3 is a schematic view of an exemplary configuration of a computer device that may be used with the simulation system shown in FIG. 2.

FIG. 3 is a schematic view of an exemplary configuration of a computer device 300 that may be used with simulation system 200 (shown in FIG. 2). Computer device 300 is operated by a user 302. Computer device 300 may include, but is not limited to, smart contract node 206 and user computer device 204 (both shown in FIG. 2). Computer device 300 includes a processor 304 for executing instructions. In some embodiments, executable instructions are stored in a memory area 306. Processor 304 may include one or more processing units (e.g., in a multi-core configuration). Memory area 306 is any device allowing information such as executable instructions and/or transaction data to be stored and retrieved. Memory area 306 includes one or more computer readable media. In some embodiments, memory area 306 includes database 212 (shown in FIG. 2). In some embodiments, memory area 306 is stored in computer device 300. In alternative embodiments, memory area 306 is stored remotely from computer device 300.

Computer device 300 also includes at least one media output component 308 for presenting information to user 302. Media output component 308 is any component capable of conveying information to user 302. In some embodiments, media output component 308 includes an output adapter (not shown) such as a video adapter and/or an audio adapter. An output adapter is operatively coupled to processor 304 and operatively coupled to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 308 is configured to present a graphical user interface (e.g., a web browser and/or a client application) to user 302. In some embodiments, computer device 300 includes an input device 310 for receiving input from user 302. User 302 may use input device 310 to, without limitation, define inputs 106 for model 104 (both shown in FIG. 1). Input device 310 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 308 and input device 310.

Computer device 300 may also include a communication interface 312, communicatively coupled to a remote device such as simulation computer device 202 (shown in FIG. 2). Communication interface 312 may include, for example, a wired or wireless network adapter and/or a wireless data transceiver for use with a mobile telecommunications network or a local area network.

Stored in memory area 306 are, for example, computer readable instructions for providing a user interface to user 302 via media output component 308 and, optionally, receiving and processing input from input device 310. A user interface may include, among other possibilities, a web browser and/or a client application. Web browsers enable users, such as user 302, to display and interact with media and other information typically embedded on a web page or a website. A client application allows user 302 to interact with, for example, simulation computer device 202. For example, instructions may be stored by a cloud service, and the output of the execution of the instructions sent to the media output component 308.

Processor 304 executes computer-executable instructions for implementing aspects of the disclosure. In some embodiments, processor 304 is transformed into a special purpose microprocessor by executing computer-executable instructions or by otherwise being programmed. For example, processor 304 is programmed with instructions discussed further below.

Figure 4:
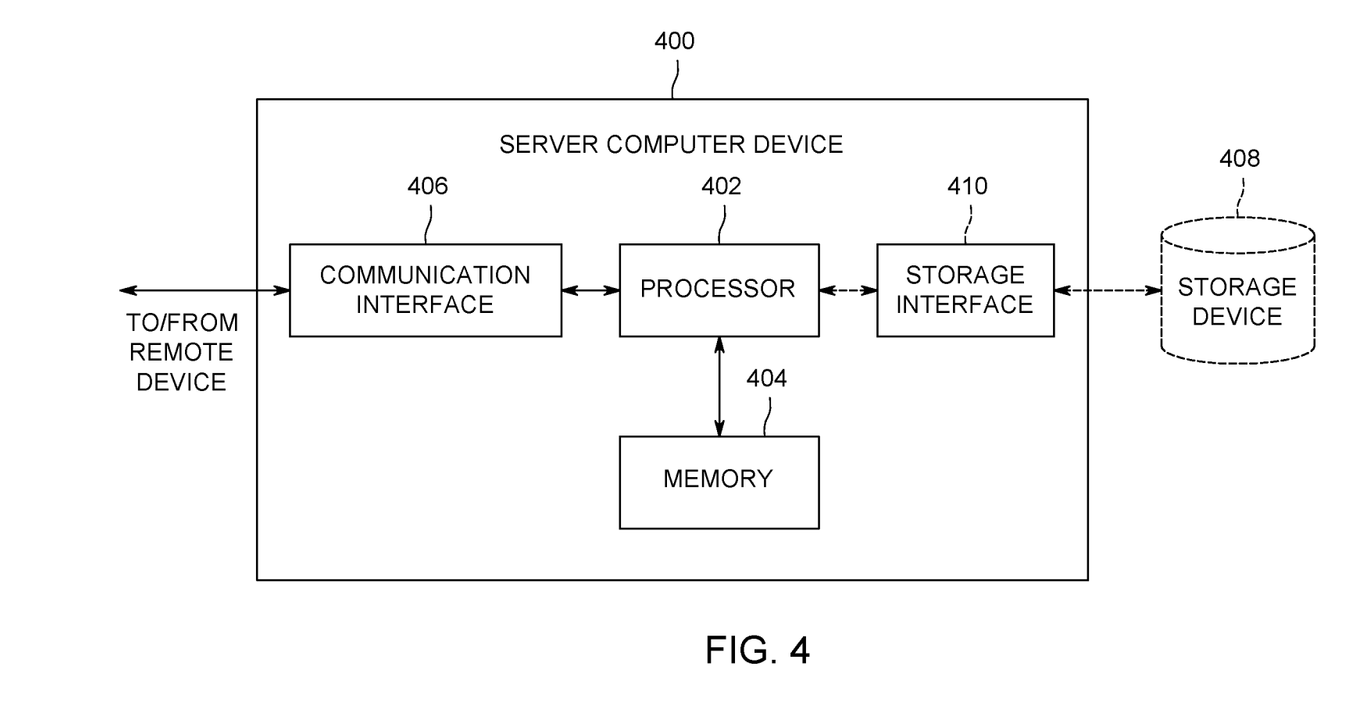
FIG. 4 is a schematic view of an exemplary configuration of configuration of a server computer device used to implement the simulation system shown in FIG. 2.

FIG. 4 is a schematic view of an exemplary configuration of a server computer device 400 used to implement simulation system 200 (shown in FIG. 2). More specifically, server computer device 400 may include, but is not limited to, simulation computer device 202, smart contract node 206, and database server 210 (both shown in FIG. 2). Server computer device 400 also includes a processor 402 for executing instructions. Instructions may be stored in a memory area 404. Processor 402 may include one or more processing units (e.g., in a multi-core configuration).

Processor 402 is operatively coupled to a communication interface 406 such that server computer device 400 is capable of communicating with a remote device, such as another server computer device 400, simulation computer device 202, smart contract node 206, or user computer devices 204 (shown in FIG. 2). For example, communication interface 406 may receive requests from user computer device 204, as illustrated in FIG. 2.

Processor 402 is also operatively coupled to a storage device 408. Storage device 408 is any computer-operated hardware suitable for storing and/or retrieving data, such as, but not limited to, data associated with database 212 (shown in FIG. 2). In some embodiments, storage device 408 is integrated in server computer device 400. For example, server computer device 400 may include one or more hard disk drives as storage device 408. In other embodiments, storage device 408 is external to server computer device 400 and is accessed by a plurality of server computer device 400. For example, storage device 408 may include a storage area network (SAN), a network attached storage (NAS) system, and/or multiple storage units such as hard disks and/or solid state disks in a redundant array of inexpensive disks (RAID) configuration.

In some embodiments, processor 402 is operatively coupled to storage device 408 via a storage interface 410. Storage interface 410 is any component capable of providing processor 402 with access to storage device 408. Storage interface 410 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 402 with access to storage device 408.

Processor 402 executes computer-executable instructions for implementing aspects of the disclosure. In some embodiments, the processor 402 is transformed into a special purpose microprocessor by executing computer-executable instructions or by otherwise being programmed. For example, the processor 402 is programmed with instructions as described further below.

Figure 5:
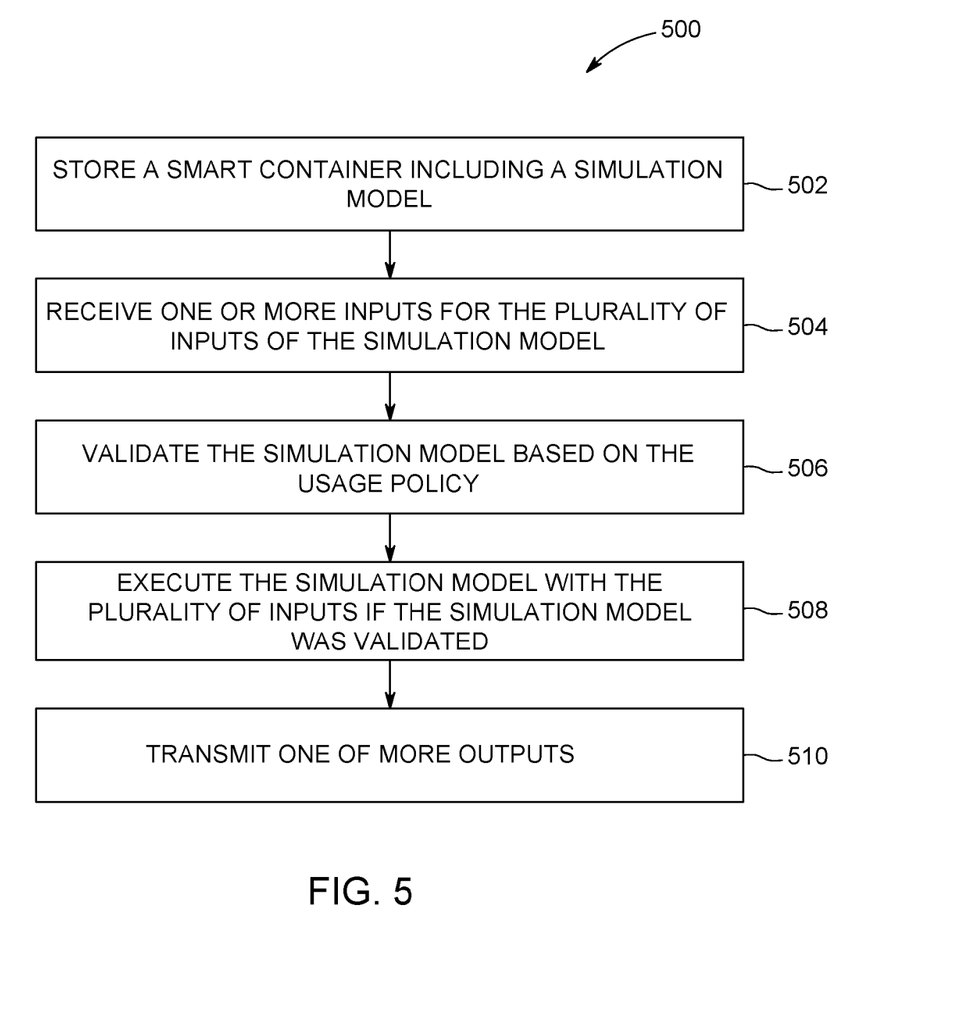
FIG. 5 is a flow chart of an exemplary process of securely executing a model using the simulation system shown in FIG. 2.

FIG. 5 is a flow chart of an exemplary process 500 of securely executing a model using simulation system 200 (shown in FIG. 2). In the exemplary embodiment, process 500 is performed by simulation computer device 202 (shown in FIG. 2), which is executing code contained in smart container 102 (shown in FIG. 1).

In the exemplary embodiment, simulation computer device 202 stores 502 smart container 102 (also known as security container) including model 104 (shown of FIG. 1). Model 104 includes a plurality of inputs and at least one output. As described above, smart container 102 includes usage policy 118 (shown of FIG. 1). In the exemplary embodiment, simulation computer device 202 receives 504 a plurality of inputs 106 (shown of FIG. 1) for model 104. In some embodiments, simulation computer device 202 receives 504 inputs 106 from user computer device 204. In other embodiments, simulation computer device 202 receives 504 inputs 106 from a second smart container 102 executing on the same simulation computer device 202 or a different simulation computer device 202. In these embodiments, the inputs 106 are outputs 108 (shown of FIG. 1) from the second smart container 102. In some further embodiments, inputs 106 are outputs 108 from a plurality of smart containers 102.

In the exemplary embodiment, simulation computer device 202 validates 506 model 104 based on usage policy 118. In some embodiments, simulation computer device 202 stores information about the plurality of inputs 106 in audit log 110 (shown of FIG. 1) and determines whether a violation of usage policy 118 occurred based on audit log 110. In these embodiments, simulation computer device 202 compares audit log 110 to usage policy 118 to detect any potential violations, such as, but not limited to, executing model 104 more times than allowed by usage policy 118, repeatedly executing model 104 too quickly (i.e., more than a predetermined number of times over a predetermined period of time), suspicious patterns of execution, such as constantly incrementing inputs, the current date being past an expiration date, inputs 106 being outside of allowed ranges, and other potential violations. Simulation computer device 202 validates 506 model 104 if there are no detected violations.

In some embodiments, simulation computer device 202 validates 506 model 104 by transmitting an internal key to a smart contract node 206 (shown in FIG. 2). Smart contract node 206 analyzes the internal key and returns an external key, such as trusted key 116 (shown in FIG. 1), to simulation computer device 202. Simulation computer device 202 receives the external key from smart contract node 206 and validates 506 model 104 based on the external key.

If model 104 was validated, simulation computer device 202 executes 508 model 104 with the plurality of inputs 106. Simulation computer device 202 receives at least one output 108 from the execution of model 104. In the exemplary embodiment, simulation computer device 202 transmits 510 the at least one output 108. In some embodiments, simulation computer device 202 transmits 510 outputs 108 to user computer device 204. In other embodiments, simulation computer device 202 transmits 510 the at least one output 108 to a second smart container 102 to be used as inputs 106 for the model 104 in that smart container 102.

In some embodiments, simulation computer device 202 prevents the execution 508 of model 104 if model 104 is not validated 506. In some further embodiments, simulation computer device 202 transmits an error message to user computer device 204. For example, if the model 104 is past its expiration date or its number of uses, simulation computer device 202 requests additional payment to extend the expiration date or for more uses. After receiving payment, simulation computer device 202 updates usage policy 118 to allow for continued use. In some embodiments, simulation computer device 202 transmits the updates to smart contract 114.

In some further embodiments, simulation computer device 202 may disable model 104 if model 104 is not validated 506. For example, simulation computer device 202 may determine that user is violating usage policy 118, such as by executing model 104 in a manner that appears to be reverse engineering, and simulation computer device 202 may disable model 104. For example, simulation computer device 202 deletes a portion of model 104 to prevent model 104 from providing accurate outputs 108. In this way, the user is unable to determine what or when model 104 was disabled to prevent user from circumventing this security feature. Simulation computer device 202 may also disable model 104 when an intrusion into smart container 102 is detected.

In these further embodiments, smart container 102 is programmed to disable model 104 to prevent unauthorized access. In some of these embodiments, smart container 102 is in communication with smart contract 114 through the Internet. In these embodiments, smart container 102 is able to determine when the user's access to model 104 has expired through usage policy 118 and smart contract 114. For example, if the model 104 may only be executed a predetermined number of times, audit log 110 and smart contract 114 track the number of times that model 104 executed. However, if the user makes a copy of smart container 102, the number of executions in audit log 110 of the copy may be incorrect. Since smart container 102 is able to access smart contract 114, these discrepancies may be resolved and/or recognized. Therefore, smart contract 114 may be able to prevent authorization of model 104 when the true count of executions is exceeded. This validation between smart contract 114 and smart container 102 may also be used to monitor expiration dates to prevent the user from changing the date on simulation computer device 202 to spoof or fool smart container 102. In these connected embodiments, smart contract 114 and/or smart container 102 may transmit and/or display messages to the user to inform the user about an upcoming expiration of model 104. In some further embodiments, smart contract 114 and/or smart container 102 may inform user of how to extend the number of executions and/or expiration date, such as by directing the user to a website to pay additional licensing fees.

In some further embodiments, smart container 102 is able to receive a remotely triggered self-destruct mechanism. For example, a user has completed all of model's licensed executions. The user makes a copy of the original smart container 102 and attempts to execute model 104. Smart contract 114 determines that this is a copy of smart container 102. In some embodiments, smart container 114 does not authorize model 104 to execute. Further, smart container 114 transmits a self-destruct message that instructs smart container 102 to delete some or all of model 104. In some embodiments, the self-destruct message may be transmitted by a remote user computer device 204. For example, user computer device 204 transmits the self-destruct message to destroy old versions of model 104 when a new version becomes available.

In other embodiments, smart container 102 is stored on a simulation computer device 202 without access to the Internet, and potentially without access to other computers. This may occur in the case of a secret or classified project, where the users wish to prevent potential leaks of information. In these embodiments, smart container 102 is programed to use usage policy 118, monitor 112, and audit log 110 to ensure proper usage of model 104. Since smart container 102 is off-line, an unscrupulous user may attempt to reverse engineer model 104 by constantly rerunning model 104 with different inputs 106 to map all of the potential outputs 108. The unscrupulous user may also attempt to breach the security of smart container 102 to view model 104 directly. The unscrupulous user may also generate multiple copies of smart container 102 to assist in the reverse engineering process. In these situations, smart container 102 includes an active defense. When active container 102 detects an attempt to reverse-engineer model 104 such as through receiving multiple sets of inputs 106 with only slight changes over a short period of time, smart container 102 determines to disable model 104 through a phased approach. If smart container 102 immediately deletes model 104 and stops providing outputs, then the unscrupulous user could determine what they did to trip the security measure and circumvent usage policy 118. In the first phase, smart container 102 starts to provide random outputs 108 from the actual values. These outputs may be slightly modified to be incorrect based on the received inputs 106. These outputs could also have a random offset. In the second stage, smart container 102 could change a part of model 104, such as rewriting one or more formula. Then in the third phase, smart container 102 could shut itself down, including deleting all or part of model 104 and refuse to execute. Everytime that smart container 102 self-destructs, each phase may last for a random amount of time and/or executions to further obfuscate the self-destruct process. By stepping through these three phases, smart container 102 obfuscates when and how it determined that user violated usage policy 118 to prevent the user from determining how to circumvent usage policy 118. By having these phases be randomly determined in length and behavior, different copies of the same smart container 102 may react differently even with the same set of inputs 106, further confounding the unscrupulous user.

Figure 6:
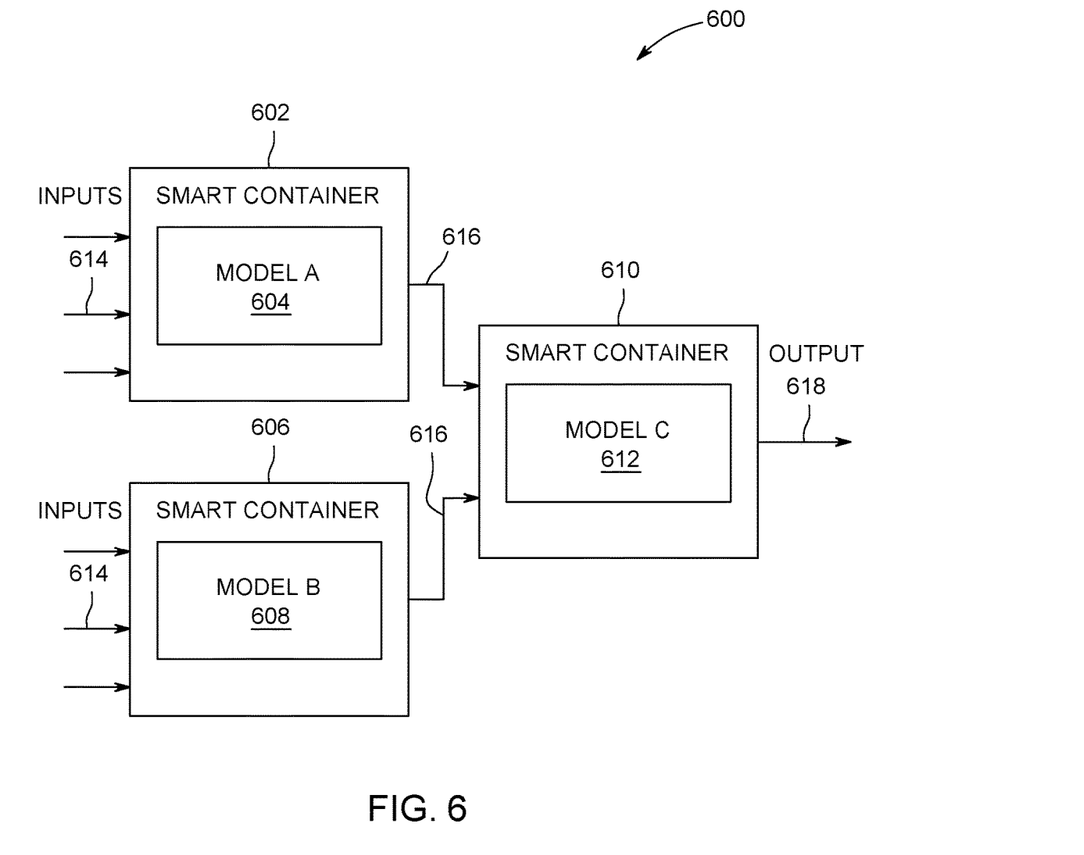
FIG. 6 is a schematic view of a plurality of connected smart containers as shown in FIG. 1.

FIG. 6 is a schematic view 600 of a plurality of connected smart containers 102 as shown in FIG. 1. In some embodiments, a plurality of smart containers 602, 606, and 610 are connected together. For example, each smart container 602, 606, and 610 each include a corresponding model 604, 608, and 612. Each model 604, 608, and 612 simulates a different interconnected component, such that the outputs 616 of model A 604 and model B 608 are also the inputs 616 of model C 612. Model C 612 uses inputs 616 to generate outputs 618.

In these embodiments, a plurality of inputs 614 are received by smart containers 602 and 606. As described above, smart containers 602 and 606 validate the inputs 614 and their corresponding models 604 and 608. After execution of models 604 and 608, smart containers 602 and 606 transmit the outputs 616 to smart container 610 to be used as inputs for model C 612. In some embodiments, outputs 616 may also include validation information for smart container 610 to show that smart containers 602 and 606 are valid.

In some embodiments, some of the smart containers have different usage policies 118 (shown in FIG. 1). For example, smart containers 602 and 604 have different usage policies 118. Smart container 602 expires after a predetermined date, while smart container 604 expires after a predetermined number of executions. Furthermore, the different smart containers 602, 606, and 610 may have been provided by different entities, such that each usage policy 118 corresponding to each of smart containers 602, 606, and 610 may include different restrictions.

In the exemplary embodiment, the different smart containers 602, 606, and 610 are replaceable. For example, if there is an update to model 604, a new smart container 602 containing the updated version 604 may replace the previous smart container 602. In another example, if smart container 606 expires, a new version of that smart container may have to be purchased. And in still another example, a user may be determining the best part for a system, such as a particular turbine. The user may have multiple models 104 to place in the smart container 606 position. The user may swap out between multiple different smart containers 606 to determine which turbine is the best fit for the system.

In some embodiments, the plurality of smart containers 602, 606, and 610 are designed to generate a digital twin of an actual system such as a vehicle or a power plant. Each interconnected smart container 602, 606, and 610 simulates a part of the interconnected system. Each asset, device, and/or process of the overall system may be simulated by a model 604, 608, and 612. The model 604, 608, and 612 may include, but is not limited to, a deep physics model, a microstructure model, a flow model, a combustion model, a thermal model, a performance model, a diagnostic model, and/or a lifting model. The models 604, 608, and 612 may be configured for control and optimization of the system. In some embodiments, the models 604, 608, and 612 may be used in concert with artificial intelligence to improve the associated system.

The models 604, 608, and 612 may be continuously tuned and adjusted based on changes to the corresponding device, new data, and additional insights about the corresponding device. The models 604, 608, and 612 are also adaptable to handle different conditions, such as climate conditions. The models 604, 608, and 612 are also scalable. This includes both in size and in quantity. For example, model 608 may simulate a particular part that is replicated many times throughout the system. The simulation system may include multiple copies of corresponding smart container 606 in the appropriate positions in the system. Whenever model 608 is updated, then all copies are correspondingly updated. The models 604, 608, and 612 may also include business outcomes to determine costs and revenues associated with the system. A user may repeatedly execute and experiment with the models 604, 608, and 612 in the system to increase insights about each asset, device, and/or process in the system to deliver specific business outcomes.

The above-described method and systems facilitate securing the intellectual property behind a model while allowing the model to be executed. Specifically, the embodiments described herein include a computing device that is configured to execute a smart container that validates a model prior to executing the model. The computing device may use a plurality of methods of validating the model, including accessing outside nodes to confirm that the user is authorized to execute the model. Once validated, the computing device executes the model and provides the outputs to the user. In some embodiments, the computer device disables the model so that the model provides invalid and/or incorrect outputs. The systems and method described herein allow for protecting the intellectual property while allowing users to access and execute the model without direct supervision.

An exemplary technical effect of the methods, systems, and apparatus described herein includes at least one of: (a) obfuscating the intellectual property behind a model; (b) disabling a model when it expires or is incorrectly accessed in a manner that is not immediately obvious; (c) tracking usage of a model to detect potential abuse; (d) providing real-time monitoring of shared intellectual property; (e) allowing secure access to models; (f) protecting compiled software packages; and (g) allowing the dissemination of demonstration models to potential purchasers.

Exemplary embodiments of methods, systems, and apparatus for securely executing models are not limited to the specific embodiments described herein, but rather, components of systems and/or steps of the methods may be utilized independently and separately from other components and/or steps described herein. For example, the methods may also be used in combination with other systems requiring multiple inputs, multiple outputs, and multiple validation methods, and are not limited to practice with only the systems and methods as described herein. Rather, the exemplary embodiment can be implemented and utilized in connection with many other applications, equipment, and systems that may benefit from protected execution of models.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A simulation computer device for securely executing a model, said simulation computer device comprising at least one processor in communication with at least one memory device, said simulation computer device configured to:
   store a smart container including the model and a usage policy;
   receive a plurality of inputs for the model;
   determine whether to validate the model based on the usage policy;
   execute, the model using the plurality of inputs to generate at least one output after the model is validated; and
   transmit the at least one output.

2. A simulation computer device in accordance with claim 1, wherein the smart container further includes an audit log, and wherein said simulation computer device is further configured to:
   store information about the plurality of inputs in the audit log; and
   determine whether a violation of the usage policy occurred based on the audit log.

3. A simulation computer device in accordance with claim 1, wherein the smart container further includes an internal key, wherein said simulation computer device is further configured to:
   transmit the internal key to a smart contract node;
   receive an external key from the smart contract node; and
   validate the model based on the external key.

4. A simulation computer device in accordance with claim 3, wherein the smart contract node is based on a blockchain and wherein the smart contract node is configured to:
   store the external key; and
   update the external key on a periodic basis.

5. A simulation computer device in accordance with claim 3, wherein the smart contract node is external to the simulation computer device.

6. A simulation computer device in accordance with claim 1, wherein said simulation computer device is further configured to:
   compare one or more inputs of the plurality of inputs to the usage policy; and
   validate the model based on the comparison.

7. A simulation computer device in accordance with claim 1, wherein the usage policy includes an expiration date, and wherein said simulation computer device is further configured to validate the model based on the expiration date and a current date.

8. A simulation computer device in accordance with claim 1, wherein said simulation computer device is further configured to validate the model based on at least one of i) a number of times that the model has been executed and ii) a number of times that the model has been executed within a predetermined period of time.

9. A simulation computer device in accordance with claim 1, wherein said simulation computer device is further configured to prevent execution of the model if the model is not validated.

10. A simulation computer device in accordance with claim 1, wherein said simulation computer device is further configured to disable the model if the model is not validated.

11. A simulation computer device in accordance with claim 10, wherein said simulation computer device is further configured to disable the model by deleting a part of the model such that the model provides incorrect outputs based on the plurality of inputs.

12. A simulation computer device in accordance with claim 1, wherein said simulation computer device is further configured to receive the plurality of inputs from a second smart container including a second model.

13. A simulation computer device in accordance with claim 1, wherein said simulation computer device is further configured to transmit the at least one output to a second smart container including a second model such that the at least one output is used as an input for the second model.

14. A method for securely executing a model, said method implemented using a simulation computer device, said simulation computer device including a processor in communication with a memory, said method comprising:
   storing, in the memory, a smart container and a usage policy;
   receiving, by the processor, a plurality of inputs for the model;
   determining, by the processor, whether to validate the model based on the usage policy;

executing, by the processor, the model with the plurality of inputs after the model is validated; and transmitting the at least one output.

15. A method in accordance with claim 14, wherein the smart container further includes an audit log, and wherein the method further comprises:

storing information about the plurality of inputs in the audit log; and determining whether a violation of the usage policy occurred based on the audit log.

16. A method in accordance with claim 14 further comprising validating the model based on at least one of an expiration date, a number of times that the model has been executed and a number of times that the model has been executed within a predetermined period of time.

17. A method in accordance with claim 14 further comprising preventing execution of the model if the model is not validated.

18. A method in accordance with claim 14 further comprising disabling the model if the model is not validated.

19. A method in accordance with claim 18, wherein disabling the model further comprises deleting a part of the model to cause the model to provide incorrect outputs based on the plurality of inputs.

20. A system for securely executing a model, said system comprising:

at least one smart contract node; and a simulation computer device in communication with said at least one smart contract node, wherein said simulation computer device comprises a processor in communication with a memory, wherein said simulation computer device is programmed to:

store a smart container including the model, a usage policy, and an internal key;

receive a plurality of inputs for the model;

transmit the internal key to said at least one smart contract node;

receive an external key from said at least one smart contract node;

determine whether to validate the model based on the external key and the usage policy;

execute, the model with the plurality of inputs after the model is validated; and transmit at least one output; and wherein the smart contract node is configured to:

store the external key;

update the external key on a periodic basis;

receive the internal key from said simulation computer device; and transmit the external key to said simulation computer device based on the received internal key.

* * * * *